264-222

2/11/86 OR 4,569,812

SR

United States Patent [19]

Werwath et al.

[11] Patent Number: 4,569,812

[45] Date of Patent: Feb. 11, 1986

[54] PROCESS FOR MAKING A HEARING AID VENT

[75] Inventors: Karl W. Werwath, Schaumburg; Jon S. DeGraff, Skokie, both of Ill.

[73] Assignee: Beltone Electronics Corporation, Chicago, Ill.

[21] Appl. No.: 623,786

[22] Filed: Jun. 22, 1984

[51] Int. Cl.⁴ ............................................ B29C 41/18

[52] U.S. Cl. .................................... 264/222; 264/255; 264/294; 264/DIG. 30

[58] Field of Search .................. 249/55, 151; 264/222, 264/255, 294, 308, 336, DIG. 30

[56] References Cited

U.S. PATENT DOCUMENTS 3,547,747 12/1970 Roberts .............................. 264/255

4,472,342 9/1984 Carr .................................. 264/222

*Primary Examiner*—Donald Czaja

*Assistant Examiner*—V. Fischbach

*Attorney, Agent, or Firm*—Allegretti, Newitt, Witcoff & McAndrews, Ltd.

[57] ABSTRACT

An improved process for making a vent for an "in the ear" hearing aid. A cavity is formed which corresponds to the structure of the ear canal and outer ear of the hearing aid user. A molding liquid, such as acrylic, is poured into the cavity. The liquid is allowed to partially cure and form a thin-walled shell inside the cavity. An elongated mandrel is then placed along the inside of the thin-walled shell, and additional liquid molding material is poured into the thin-walled shell around the elongated mandrel. The wall of the shell accordingly becomes thicker, enveloping the mandrel. The mandrel may then be removed, leaving the vent in the wall of the shell.

10 Claims, 7 Drawing Figures

Fig. 2
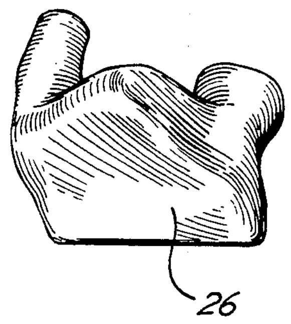
Fig. 3
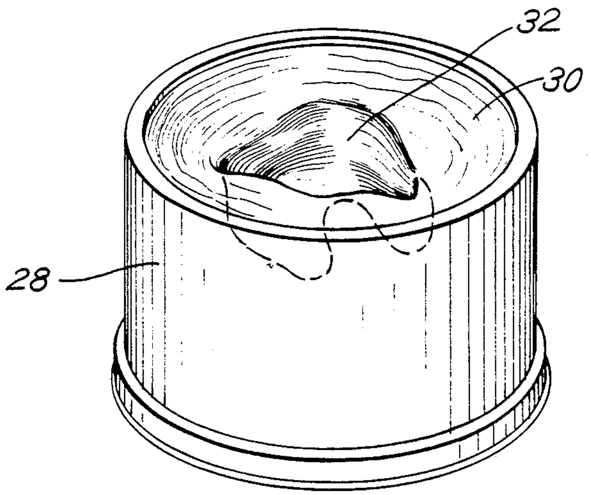
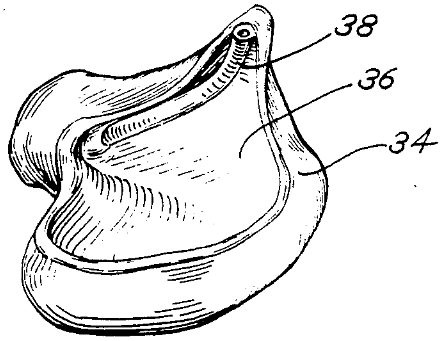
Fig. 4
(PRIOR ART)
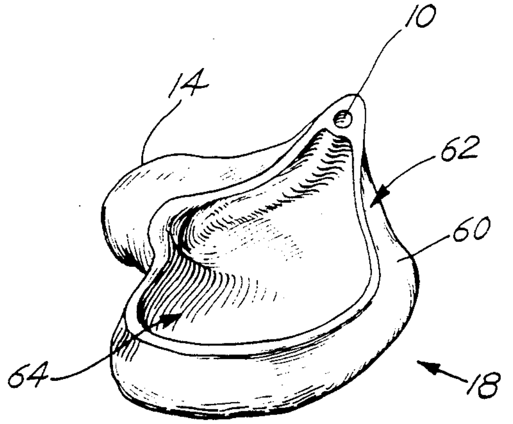
Fig. 5

PROCESS FOR MAKING A HEARING AID VENT

BACKGROUND OF THE INVENTION

The present invention relates generally to a vent and more particularly to a process for making a vent in a hearing aid. In many hearing aids, a vent, or hollow chamber, extends from one end of a hearing aid to another. Thus, when the hearing aid is inserted into the ear canal of a user, air may flow through the hearing aid and thus relieve air pressure that builds up between the hearing aid and the inner ear. In addition, the vent modifies the frequency response of the hearing aid, allowing it to produce a more desirable sound.

Many times a vent is made in a hearing aid by placing a length of tubing from one end of the hearing aid to the other. The tube is then glued to the inside of the hearing aid to maintain it in a fixed position.

Such a process for constructing a vent in a hearing aid is often troublesome for hearing aid manufacturers. Since the shell and vent are made independently, the steps of cutting the tubing and gluing it to the inside of the hearing aid require hand work by skilled laborers. Thus, the cost of manufacturing the hearing aid is higher than it would otherwise be.

In addition, the tubing and glue used to construct the vent fill a significant amount of space within the hearing aid. Thus, the hearing aid is larger than would otherwise be necessary to hold the vent and other components of the hearing aid.

SUMMARY OF THE INVENTION

In a principal aspect, the present invention is an improved process for making a vent in a hearing aid. A mold of an internal structure of a user's ear canal and external ear is inserted into a duplication pot. A "gelable" liquid is poured into the duplication pot and allowed to change into a gel (cure) and form a "reverse" impression of the mold.

The mold of the internal structure of the user's ear is then removed from the duplication pot, and a liquid molding material such as acrylic is poured into the impression of the mold. The molding material is allowed to partially cure and form a thin-walled shell within the impression. The thin-walled shell includes open and closed ends and a side wall.

Liquid molding material is then drained from the thin-walled shell, the remaining material is completely cured, and a vent hole is drilled in the closed end of the thin-walled shell. An elongated flexible mandrel is placed in the shell, along the side wall, between the vent hole and the open end. The thin-walled shell is then filled with more liquid molding material, and the molding material is allowed to partially cure, leaving a shell with a thick wall within the impression. The flexible mandrel is within the thick wall of the shell.

Finally, the liquid molding material remaining in the shell is drained, the thick-walled shell is completely cured, and the shell is removed from the impression. The flexible material may then be pulled from the thick wall of the shell, leaving a vent within the wall which extends from the vent hole to the open end of the shell.

An object of the present invention is an improved process for making a vent in a hearing aid. Another object is a process for forming a hearing aid vent and shell simultaneously. Still another object is a process for making a vent that requires less labor, and thus allows hearing aids to be manufactured more inexpensively.

Yet another object of the present invention is a process for more easily making a vent that is within the wall of a hearing aid shell. A further object is a process for making a vent that uses less room within a hearing aid shell, thus allowing the hearing aid to be smaller.

These and other objects, features, and advantages of the present invention are discussed or apparent in the following detailed description.

BRIEF DESCRIPTION OF THE DRAWING

A preferred embodiment of the present invention is described herein with reference to the drawing wherein:

FIG. 2 is a perspective view of a mold used with the present invention of FIG. 1;

FIG. 3 is a perspective view of the duplication pot (after the mold of FIG. 2 has been removed) as used with the present invention of FIG. 1;

FIG. 4 is a perspective view of a hearing aid shell which was used prior to the present invention of FIG. 1;

FIG. 5 is a perspective view of the hearing aid shell shown in FIG. 1;

DETAILED DESCRIPTION OF THE PREFERRED EMBODIMENT

Figure 1:
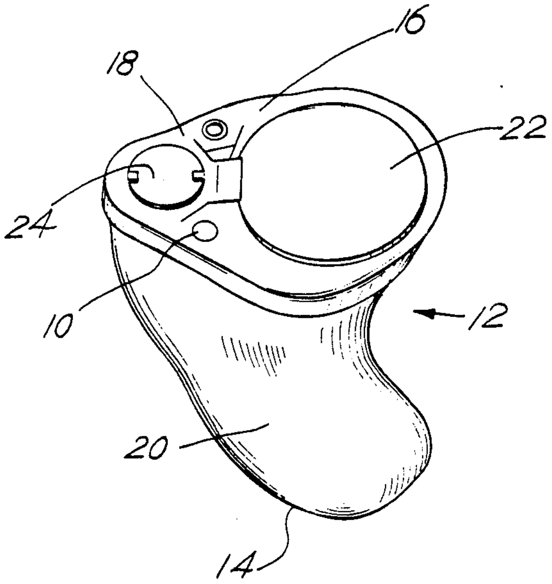
FIG. 1 is a perspective view of a hearing aid utilizing a vent made by using the preferred embodiment of the present invention.
Figure 6:
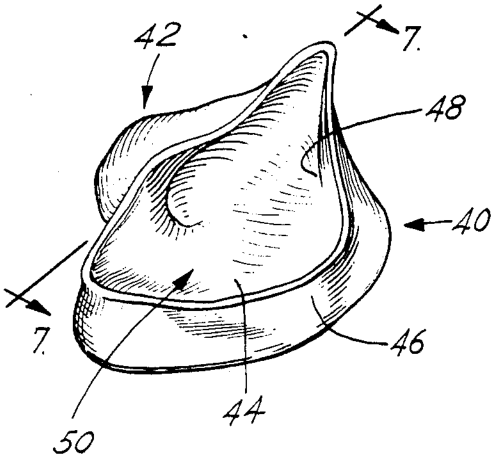
FIG. 6 is a perspective view of a thin-walled hearing aid shell, as it appears during the process of making the hearing aid shell shown in FIG. 5.
Figure 7:
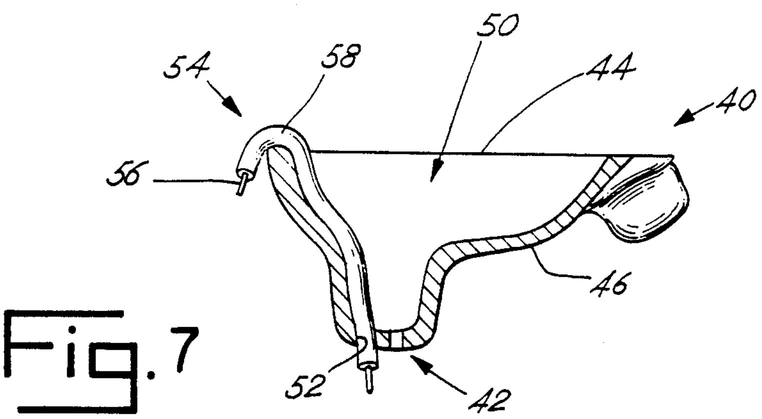
FIG. 7 is a cross-sectional view of the thin-walled hearing aid shell of FIG. 6, taken substantially along line 7—7.

Referring to FIGS. 1-7, the preferred embodiment of the present invention is an improved process for making a vent 10 for a hearing aid 12. The term hearing aid as used herein refers to any type of "in the ear" or "canal" aid. Such a hearing aid 12 defines an inner portion 14, which may be inserted into the ear canal of a user (not shown) and an outer portion 16, which faces out of the ear canal of the user when worn. Typically, the hearing aid 12 also includes the vent 10, which allows air to pass between the inner and outer portions 14, 16 of the hearing aid 12.

The vent 10 of the hearing aid 12 relieves any pressure that may build up in the inner ear (not shown) upon inserting the hearing aid 12 into the ear canal. In addition, the vent 10 may modify the frequency response of the hearing aid 12 in a predetermined manner, thus improving the quality of sound emitted by the hearing aid 12 and heard by the user.

As shown in FIG. 1, the hearing aid 12 includes a faceplate 18 and shell 20. The faceplate 18 includes a door 22 for receiving a hearing aid battery (not shown) and a knob 24 for controlling the volume of the sound emitted by the hearing aid 12.

The shell 20 is made for a particular user. Thus, the shell 20 is molded in acrylic to fit the contours of the ear canal of each individual user. The process of forming the shell 20 typically occurs as follows.

First, impression material, such as methylmethacrylate, is inserted into the external ear and ear canal of the intended user. Applicants have found the impression material manufactured by Midstate Laboratories, Inc. of Wichita, Kans. to work satisfactorily with the present invention. The impression thus forms into a mold 26 which is a reverse impression of the external ear and ear canal. See FIG. 2.

The mold 26 is inserted into a cylindrically shaped duplication pot 28. A hydrocolloid liquid (not shown) is then poured into the molding pot 28 around the mold 26. After approximately 15–20 minutes, the hydrocolloid material forms a solid gel 30 around the mold 26. Applicants have found that the hydrocolloid manufactured by Niranum, Corp. of Long Island, N.Y. works satisfactorily with the present invention.

The mold 26 is next removed from the solid gel 30 within the duplication pot 28, leaving a cavity 32 therein. A liquid molding material, such as acrylic (not shown), is then poured into the cavity 32 to form the shell 20. Applicants have found, for example, that approximately 20 milliliters of acrylic polymer methylmethacrylate and 9 milliliters of monomer methylmethacrylate may be mixed together and then poured into the cavity 32 to form the shell 20.

Often, in the past, the acrylic (molding material) in the cavity 32 was simply allowed to stand for approximately 2 minutes. The duplication pot 28 was then inverted to drain out any liquid acrylic within the cavity 32, leaving a shell 34 of partially cured acrylic within the cavity 32. The shell 34 defines an interior surface 36. A length of tubing 38 was then glued, or otherwise attached, to the interior surface 36 of the shell 34.

Applicants, however, have discovered a method for manufacturing the vent 10 at the same time the shell 20 is made. In this way, the time-consuming step of affixing the tubing 38 to the shell 34 may be avoided, and the vent 10 is conveniently located within the shell 20 itself.

According to the present invention, the acrylic is poured into the cavity 32 and allowed to stand for approximately ½ minute. The duplication pot 28 is then inverted to drain out any liquid acrylic within the cavity 32. A "skin," or thin-walled shell 40, of hardened acrylic remains in the cavity 32. See FIGS. 3 and 6. The thin-walled shell 40 includes closed and open ends 42, 44. The closed end defines external and internal surfaces 46, 48, separated by approximately 0.015 inch of hardened acrylic. The internal surface 48 defines an interior 50 of the thin-walled shell 40.

The thin-walled shell 40 within the duplication pot 28 may be placed in a pressure chamber, such as a pressure cooker (not shown). The pressure chamber includes water for immersing the duplication pot 28 and thin-walled shell 40. The temperature of the water is approximately 120° Fahrenheit, and the air pressure within the pressure chamber is rained to approximately 30 pounds per square inch.

While the present invention may be practiced without placing the thin-walled shell 40 in the pressure chamber, applicants have discovered that an environment of increased temperature (110°–130° Farenheit) and increased pressure (20–30 pounds per square inch) causes the acrylic forming the thin-walled shell 40 to cure faster. Accordingly, use of the pressure chamber allows the shell 20 to be made more quickly and economically. (Applicants have also observed that an environment with a temperature between 80° and 160° Farenheit and a pressure of between 10 and 60 pounds per square inch is also adequate for curing).

The thin-walled shell 40 is removed from the elevated temperature and pressure in the pressure chamber after approximately ten minutes. Suitable curing may also be effected, for example, if the elevated temperature and pressure are maintained for 60 minutes.

A hole 52, approximately 0.080 inch in diameter, is drilled in the closed end 44 of the thin-walled shell 40. See FIG. 7. Of course, drilling is the equivalent of other methods by which a hole is made in the thin-walled shell 40.

Thereafter, an elongated flexible mandrel (or wire) 54, approximately two inches long, is placed along the internal surface 48 of the thin-walled shell 40. The flexible mandrel 54 includes a central length of solder 56 and a coating of non-adhesive tubing 58. In the preferred embodiment, the tubing 56 is comprised of silicone rubber, but other non-stick materials, to which acrylic does not readily adhere, may also be used.

The tubing 58 defines an outside diameter of 0.080 inch, but tubings with other diameters, ranging, for example, up to 0.175 inch, may be used. The flexible mandrel 54 extends through the hole 52 in the closed end 44 of the thin-walled shell 40 and above the open end 42.

Next, approximately 29 milliliters of liquid acrylic are poured into the interior 50 of the thin-walled shell 40 and allowed to stand for approximately one minute. At this time, acrylic against the interior surface of the thin-walled shell 40 and the flexible mandrel 54 cures to form the (thick-walled) shell 20. See FIG. 5. Thereafter, the (thick-walled) shell 20 is inverted to drain out any excess liquid acrylic therein.

The shell 20 includes a wall 60 having external and internal surfaces 62, 64, and the internal surface 64 defines an interior 66. The distance between the external and internal surfaces 62, 64 (the thickness of the wall 60) is approximately 0.030 inch. The acrylic wall 60 is formed around the flexible mandrel 54.

The shell 20, within the duplication pot 28, is placed in the pressure chamber for additional curing. The temperature and pressure are maintained approximately at the same levels as previously described for the thin-walled shell 40. The shell 20 is left in the pressure chamber for approximately 10 minutes (although, as before, time periods of up to 60 minutes could also be used).

After such curing, the shell 20 may be removed from the pressure chamber. The flexible mandrel 54 may also be removed from the wall 60 of the shell 20, leaving the vent 10 formed by the flexible mandrel 54 free of obstruction.

The vent 18 resulting from the removal of the flexible mandrel 54 from the wall 60 of the shell 18 is shown in FIG. 5. Components (not shown) and the faceplate 18 for the hearing aid 12 may then be inserted into the shell 20 to form the hearing aid 12 shown in FIG. 1.

A preferred embodiment of the present invention has been described herein. It is to be understood, however, that changes and modifications can be made without departing from the true scope and spirit of the present invention. For example, those of ordinary skill in the art will readily recognize that the sequence of the steps previously described may be changed without departing from the true scope and spirit of the present invention. This true scope and spirit are defined by the following claims and their equivalents, to be interpreted in light of the foregoing specification.

What is claimed is:

1. A process for making a vent in a hearing aid for use in an ear, said ear defining an internal structure, comprising:

inserting a mold of said internal structure of said ear in a duplication pot;

pouring a gelatinous liquid into said duplication pot;

allowing said gelatinous liquid to gel and form an impression of said mold;

removing said mold from said duplication pot;

pouring liquid molding material into said impression of said mold in said duplication pot and allowing said liquid molding material to partially cure and form a preliminary shell with a thin wall within said impression, said preliminary shell including closed and open ends and a side wall therebetween, said closed end and side wall defining an interior of said preliminary shell;

draining liquid molding material from said interior of said preliminary shell;

drilling a vent hole in said closed end of said preliminary shell;

placing an elongated mandrel in said interior of said preliminary shell, substantially adjacent to said side wall between said vent hole and said open end of said preliminary shell;

pouring liquid molding material into said interior of said preliminary shell and allowing said liquid molding material to partially cure and form a final shell with a thick wall within said impression, said thick wall being in the order of approximately twice as thick as said thin wall, said elongated mandrel lying within said thick wall and said thick wall defining an interior of said final shell;

draining liquid molding material from said interior of said final shell;

removing said final shell from said dupliction pot; and removing said elongated mandrel from said final shell, whereby said final shell includes said vent in said thick wall between said vent hole and open end.

2. A process for making a vent in a hearing aid for use in an ear, said ear defining an internal structure, comprising:

inserting a mold of said internal structure of said ear in a duplication pot;

pouring a gelatinous liquid into said duplication pot;

allowing said gelatinous liquid to gel and form an impression of said mold;

removing said mold from said duplication pot;

pouring liquid molding material into said impression of said mold in said duplication pot and allowing said liquid molding material to partially cure and form a preliminary shell with a thin wall within said impression, said thin wall being in the order of approximately 0.015 inch thick, said preliminary shell including closed and open ends and a side wall therebetween, said closed end and side wall defining an interior of said preliminary shell;

draining liquid molding material from said interior of said preliminary shell;

drilling a vent hole in said closed end of said preliminary shell;

placing an elongated mandrel in said interior of said preliminary shell, substantially adjacent to said side wall between said vent hole and said open end of said preliminary shell;

pouring liquid molding material into said interior of said preliminary shell and allowing said liquid molding material to partially cure and form a final shell with a thick wall within said impression, said thick wall being in the order of approximately 0.03 inch thick, said elongated mandrel lying within said thick wall and said thick wall defining an interior of said final shell;

draining liquid molding material from said interior of said final shell;

removing said final shell from said dupliction pot; and removing said elongated mandrel from said final shell, whereby said final shell includes said vent in said thick wall between said vent hole and open end.

3. A process for making a vent as claimed in claim 2 further comprising the steps of increasing both ambient temperature and pressure around said preliminary and final shells after draining said liquid acrylic therefrom.

4. The process as claimed in claim 2 wherein said liquid molding material is comprised substantially of acrylic.

5. The process as claimed in claim 2 further comprising the step of forming said mold by inserting impression material into an ear of a wearer.

6. The process as claimed in claim 2 wherein said elongated mandrel includes a non-adhesive coating.

7. The process as claimed in claim 2 wherein said elongated mandrel defines a diameter of less than 0.175 inch.

8. The process as claimed in claim 2 wherein said steps of increasing ambient temperature and pressure around said preliminary and final shells include the steps depositing said duplication pot and said shell in water having a temperature between 80° and 160° Farenheit and increasing said ambient pressure to between 10 and 60 pounds per square inch.

9. The process as claimed in claim 8 wherein said steps of increasing ambient temperature and pressure last less than 60 minutes.

10. The process as claimed in claim 9 wherein said elongated mandrel defines a diameter of less than 0.175 inch.

* * * * *